US009674646B2

(12) United States Patent
Jang et al.

(10) Patent No.: US 9,674,646 B2
(45) Date of Patent: Jun. 6, 2017

(54) NEAR FIELD COMMUNICATION CHIP EMBEDDED IN A WEARABLE ELECTRONIC DEVICE AND WEARABLE ELECTRONIC DEVICE

(71) Applicants: Yo-Han Jang, Seoul (KR);
Byeong-Taek Moon, Seoul (KR);
Young-Ki Lee, Incheon (KR); Il-Jong Song, Suwon-si (KR); Byeong-Hoon Lee, Seoul (KR)

(72) Inventors: Yo-Han Jang, Seoul (KR);
Byeong-Taek Moon, Seoul (KR);
Young-Ki Lee, Incheon (KR); Il-Jong Song, Suwon-si (KR); Byeong-Hoon Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/940,247

(22) Filed: Nov. 13, 2015

(65) Prior Publication Data

US 2016/0142866 A1     May 19, 2016

Related U.S. Application Data

(60) Provisional application No. 62/079,173, filed on Nov. 13, 2014.

(30) Foreign Application Priority Data

Mar. 5, 2015  (KR) .......................... 10-2015-0030839

(51) Int. Cl.
*H04B 5/00*      (2006.01)
*H04W 4/00*   (2009.01)
(Continued)

(52) U.S. Cl.
CPC ............ *H04W 4/008* (2013.01); *H01Q 1/273* (2013.01); *H01Q 7/00* (2013.01); *H02J 5/005* (2013.01); *H04B 5/0031* (2013.01); *H04B 5/0081* (2013.01)

(58) Field of Classification Search
CPC .......... H01Q 7/00; H01Q 1/273; H02J 5/005; H04B 5/0031; H04B 5/0081; H04B 5/0025; H04W 4/008; G06F 1/163
See application file for complete search history.

(56) References Cited

U.S. PATENT DOCUMENTS 4,955,084 A * 9/1990 Umetsu ................... H01Q 1/52
343/702
5,408,699 A * 4/1995 Yamashita ............... H01Q 1/22
340/7.55
(Continued)

FOREIGN PATENT DOCUMENTS

JP       4104630 B2    6/2008
JP       4644534 B2    3/2011
(Continued)

*Primary Examiner* — Lewis West
(74) *Attorney, Agent, or Firm* — Harness, Dickey & Pierce, P.L.C.

(57) ABSTRACT

A wearable electronic device according to example embodiments includes a display panel configured to display an image, a main board including a processor configured to control an operation of the wearable electronic device, a metal frame defining a perimeter of the wearable electronic device, the metal frame including a metal material, the metal frame having first and second terminals, the first terminal being adjacent to the second terminal with a slit therebetween, a loop antenna between the display panel and the main board, the loop antenna configured to connect to the first and second terminals of the metal frame, and a near field communication (NFC) chip configured to connect to the metal frame and the loop antenna, the NFC chip configured (Continued)

to perform a near field communication by transmitting or receiving an NFC signal using the metal frame and the loop antenna.

20 Claims, 15 Drawing Sheets

(51) Int. Cl.
*H01Q 7/00* (2006.01)
*H01Q 1/27* (2006.01)
*H02J 4/00* (2006.01)
*H02J 5/00* (2016.01)

(56) References Cited

U.S. PATENT DOCUMENTS

| | | | |
|---|---|---|---|
| 5,757,326 | A | 5/1998 | Koyama et al. |
| 8,610,629 | B2 * | 12/2013 | Pascolini ............... H01Q 1/243 343/700 MS |
| 2007/0232371 | A1 | 10/2007 | Soekawa et al. |
| 2012/0016793 | A1 | 1/2012 | Peters et al. |
| 2012/0112969 | A1 | 5/2012 | Caballero et al. |
| 2012/0206302 | A1 * | 8/2012 | Ramachandran ........ H01Q 1/24 343/702 |
| 2014/0087674 | A1 * | 3/2014 | Teng ........................ H01Q 5/35 455/90.3 |
| 2014/0111389 | A1 * | 4/2014 | Jung .................... H01Q 1/2208 343/702 |
| 2014/0113693 | A1 * | 4/2014 | Wei ........................ H01Q 1/243 455/575.7 |
| 2014/0154980 | A1 | 6/2014 | Jang et al. |
| 2014/0300518 | A1 * | 10/2014 | Ramachandran ...... H01Q 1/243 343/702 |
| 2014/0328084 | A1 * | 11/2014 | Chuang ................ H05K 5/0017 362/623 |
| 2015/0009077 | A1 * | 1/2015 | Lee ........................ H01Q 1/243 343/702 |
| 2015/0109168 | A1 * | 4/2015 | Chang .................... H01Q 1/243 343/700 MS |
| 2015/0178532 | A1 * | 6/2015 | Brul ................... G06K 19/0717 340/5.61 |
| 2015/0214620 | A1 * | 7/2015 | Yosui ....................... H01Q 7/00 343/702 |
| 2016/0064804 | A1 * | 3/2016 | Kim ....................... H01Q 1/243 343/702 |
| 2016/0111771 | A1 * | 4/2016 | Su ......................... H01Q 1/243 343/702 |
| 2016/0190693 | A1 * | 6/2016 | Wu ........................ H01Q 7/00 343/870 |
| 2016/0254587 | A1 * | 9/2016 | Jung ...................... H01Q 1/22 |

FOREIGN PATENT DOCUMENTS

| | | |
|---|---|---|
| JP | 4687417 B2 | 5/2011 |
| KR | 10-0764444 B1 | 10/2007 |
| KR | 10-2014-0072643 A | 6/2014 |

* cited by examiner

NEAR FIELD COMMUNICATION CHIP EMBEDDED IN A WEARABLE ELECTRONIC DEVICE AND WEARABLE ELECTRONIC DEVICE

CROSS-REFERENCE TO RELATED APPLICATIONS

This U.S. non-provisional application claims the benefit of priority under 35 U.S.C. §119 to U.S. Provisional Application No. 62/079,173 filed on Nov. 13, 2014 in the USPTO, and Korean Patent Application No. 10-2015-0030839 filed on Mar. 5, 2015 in the Korean Intellectual Property Office (KIPO), the entire contents of each of which are incorporated by reference herein in their entireties.

BACKGROUND

1. Technical Field

Example embodiments relate to electronic devices. For example, at least some example embodiments relate to near field communication chips embedded in wearable electronic devices, and wearable electronic devices including the same.

2. Description of the Related Art

A wearable electronic device is an electronic device that is used while being worn on, for example, a human body, such as a wrist, a neck, a head, etc. Since the wearable electronic device may provide various services with great portability, the use of the wearable electronic devices is increasing. However, a conventional wearable electronic device may not provide a near field communication (NFC) or may perform the near field communication only via a back surface of the wearable electronic device opposite to a front surface where a display panel is located, and thus the conventional the wearable electronic device may require the user to take off the wearable electronic device to perform the near field communication.

SUMMARY

Some example embodiments provide a near field communication (NFC) chip configured to perform the near field communication while a wearable electronic device is worn.

Some example embodiments provide a wearable electronic device configured to perform the near field communication while being worn.

According to example embodiments, a wearable electronic device includes a display panel configured to display an image, a main board including a processor configured to control an operation of the wearable electronic device, a metal frame defining a perimeter of the wearable electronic device, the metal frame including a metal material, the metal frame having first and second terminals, the first terminal being adjacent to the second terminal with a slit therebetween, a loop antenna between the display panel and the main board, the loop antenna configured to connect to the first and second terminals of the metal frame, and a near field communication (NFC) chip configured to connect to the metal frame and the loop antenna, the NFC chip configured to perform a near field communication by transmitting or receiving an NFC signal using the metal frame and the loop antenna.

In some example embodiments, the loop antenna may have third and fourth terminals, the third terminal may be adjacent to the fourth terminal with a cut portion therebetween, and the NFC chip may be configured to connect to the metal frame and the loop antenna through the third and fourth terminals of the loop antenna.

In some example embodiments, the metal frame may further include a third terminal and a fourth terminal, the third terminal being adjacent to the fourth terminal with a second slit therebetween, and wherein the NFC chip may be configured to connect to the metal frame and the loop antenna through the third and fourth terminals of the metal frame.

In some example embodiments, the loop antenna may include a loop coil including a metal material, the loop coil having two or more turns.

In some example embodiments, the loop coil may have one of a circular shape, a rectangular shape, a polygonal shape and an elliptical shape.

In some example embodiments, the loop coil may have a multi-layer structure.

In some example embodiments, the loop antenna may further include a secondary loop coil spaced apart from the loop coil, and the secondary loop coil may be configured to magnetically couple to the loop coil.

In some example embodiments, the loop coil and the secondary loop coil may be at a same layer, and the secondary loop coil may be configured to surround the loop coil.

In some example embodiments, the loop coil and the secondary loop coil may be at a same layer, and the loop coil may be configured to surround the secondary loop coil.

In some example embodiments, the loop coil and the secondary loop coil may be at different layers.

In some example embodiments, the wearable electronic device may further include a magnetic sheet between the loop antenna and the main board.

In some example embodiments, the wearable electronic device may further include a magnetic sheet on an inner surface of the metal frame.

In some example embodiments, the wearable electronic device may further include a printed circuit board (PCB) configured to connect the display panel and the main board, and the loop antenna may be between the PCB and the main board.

In some example embodiments, the wearable electronic device may further include a printed circuit board (PCB) configured to connect the display panel and the main board, and the loop antenna may be between the display panel and the PCB.

In some example embodiments, the wearable electronic device may further include a printed circuit board (PCB) configured to connect the display panel and the main board, the PCB may be on a first portion of a back surface of the display panel, and the loop antenna may be on a second portion of the back surface of the display panel such that the loop antenna does not overlap the PCB.

In some example embodiments, the wearable electronic device may further include a wireless charging circuit connected to the loop antenna, and the loop antenna may be configured to wirelessly supply the wireless charging circuit with power.

In some example embodiments, the wearable electronic device may be configured to pair with one or more of a wireless communication device, an electronic payment device and a data transfer device through the near field communication while the wearable electronic device is worn on a body of a user.

According to example embodiments, a near field communication (NFC) chip is configured to connect to a metal frame and a loop antenna. The metal frame defines a perimeter of a wearable electronic device, the loop antenna is between a display panel and a main board of the wearable electronic device, and the loop antenna is configured to connect to the metal frame. The NFC chip includes an NFC controller configured to perform a near field communication by transmitting or receiving an NFC signal using the metal frame and the loop antenna.

In some example embodiments, the NFC chip may further include a secure storage device connected to the NFC controller, the secure storage device configured to store information, and the NFC controller may be configured to transfer the information to an external device through the near field communication.

According to example embodiments, a near field communication (NFC) device includes an antenna configured to transmit NFC signals in a direction perpendicular to a display panel of an electronic device associated therewith, and configured to connect to a metal frame of the electronic device, and an NFC chip configured to transmit, via the antenna and the metal frame, the NFC signals to an external device.

As described above, the near field communication (NFC) chip and the wearable electronic device according to example embodiments may use the loop antennal located between the display panel and the main board and/or the metal frame at the perimeter of the wearable electronic device, and thus may perform the near field communication while the wearable electronic device is worn.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
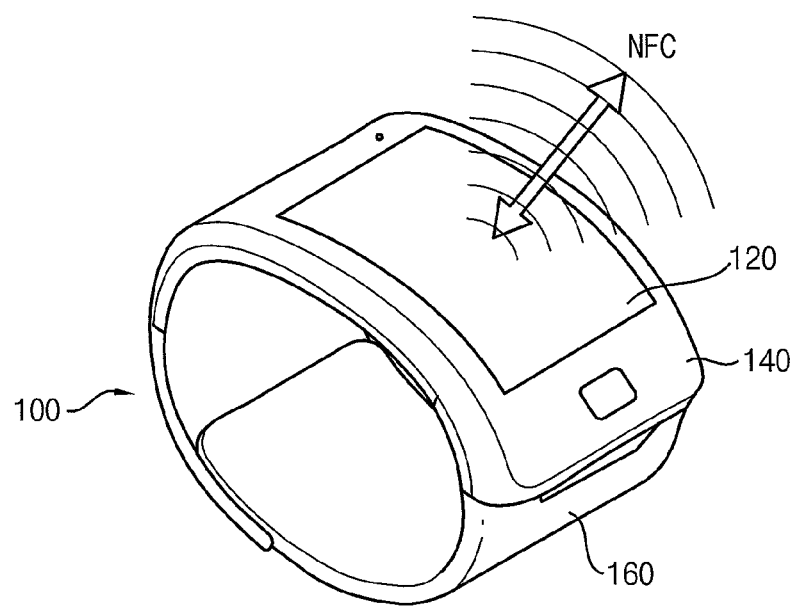
FIG. 1 is a diagram illustrating an example of a wearable electronic device according to example embodiments.

Various example embodiments will be described more fully hereinafter with reference to the accompanying drawings, in which some example embodiments are shown. Example embodiments of the inventive concepts may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the example embodiments of the inventive concepts.

Unless otherwise defined, all terms (including technical and scientific terms) used herein have the same meaning as commonly understood by one of ordinary skill in the art to which these example embodiments of the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
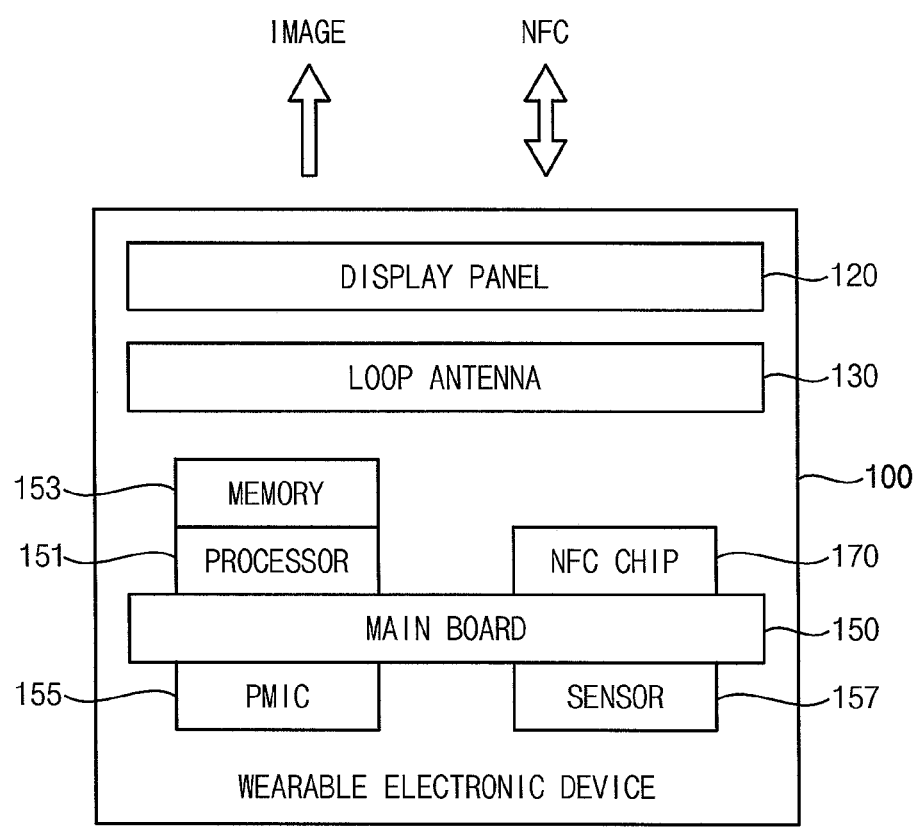
FIG. 2 is a diagram for describing a configuration of a wearable electronic device according to example embodiments.
Figure 3:
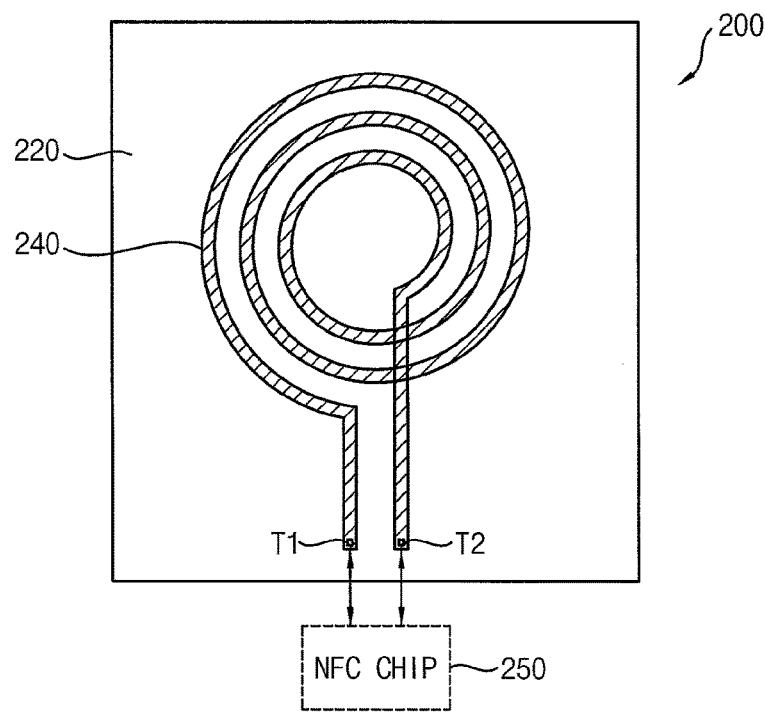
FIG. 3 is a diagram illustrating an example of a loop antenna included in a wearable electronic device according to example embodiments.
Figure 4:
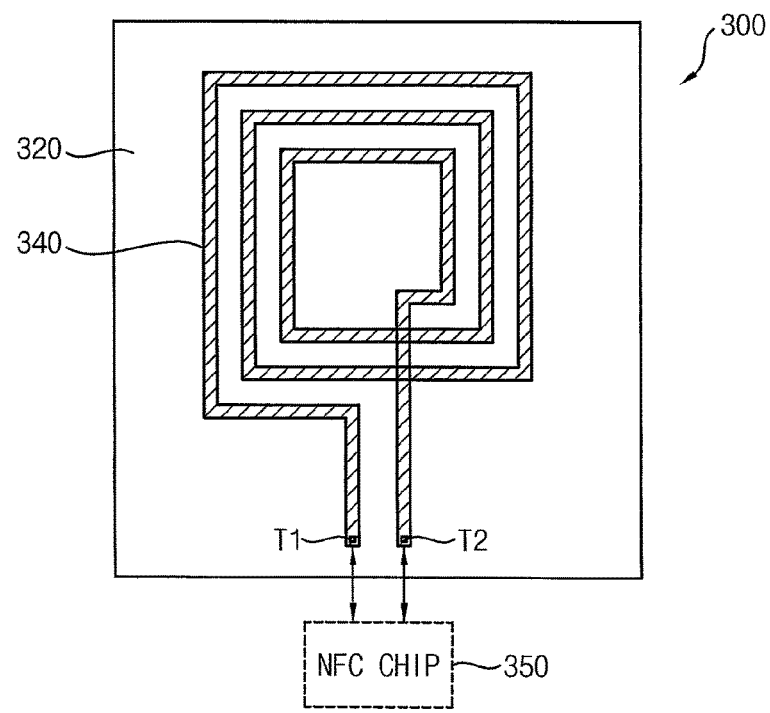
FIG. 4 is a diagram illustrating another example of a loop antenna included in a wearable electronic device according to example embodiments.

FIG. 1 is a diagram illustrating an example of a wearable electronic device according to example embodiments, FIG. 2 is a diagram for describing a configuration of a wearable electronic device according to example embodiments, FIG. 3 is a diagram illustrating an example of a loop antenna included in a wearable electronic device according to example embodiments, and FIG. 4 is a diagram illustrating another example of a loop antenna included in a wearable electronic device according to example embodiments.

Referring to FIGS. 1 and 2, a wearable electronic device 100 according to example embodiments may be used while being worn on a body, such as a wrist, a neck, a head, etc., of a user. In some example embodiments, as illustrated in FIG. 1, the wearable electronic device 100 may be a wrist-worn electronic device, such as a smart watch, a wrist band, etc. However, the wearable electronic device 100 according to example embodiments may not be limited to the wrist-worn electronic device, and may be any wearable electronic device. For example, the wearable electronic device 100 may be a necklace type electronic device, a glasses type electronic device, etc.

In some example embodiments, the wearable electronic device 100 may include a display panel 120. In some example embodiments, the wearable electronic device 100 may also include a frame 140 and a band portion 160. In other example embodiments, the wearable electronic device 100 may be separate from the frame 140 and the band portion 160.

The display panel 120 may display an image, and may have any shape, such as a circular shape, a rectangular shape, a polygonal shape having five or more sides, an elliptical shape, or the like. The frame 140 may be formed to surround the display panel 120, and may define a perimeter of the wearable electronic device 100. In some example embodiments, the frame 140 may expose a button, a camera lens, an infrared module, etc.

The frame 140 may be formed of various materials. In some example embodiments, the frame 140 may be a metal frame including a metal material. The band portion 160 may be formed to be worn by the user. In some example embodiments, the band portion 160 may include one or more materials, such as a rubber, a silicone, a plastic, a Mylar, a vinyl, a metal, etc.

As illustrated in FIG. 2, the wearable electronic device 100 may include the display panel 120 and a main board 150 under the display panel 120.

The display panel 120 may display an image. In some example embodiments, the display panel 120 may be an organic light emitting diode (OLED) display panel or a liquid crystal display (LCD) panel, but example embodiments are not limited thereto. In some example embodiments, the display panel 120 may be a curved display panel having a curved surface or a flat display panel having a flat surface, but example embodiments are not limited thereto. Further, in some example embodiments, the display panel 120 may have any shape, such as a circular shape, a rectangular shape, a polygonal shape having five or more sides, an elliptical shape, or the like. In some example embodiments, the display panel 120 may include a touch sensor, such as an add-on type touch sensor, an on-cell type touch sensor, an in-cell type touch sensor, etc.

A processor 151 that controls an operation of the wearable electronic device 100 may be disposed on the main board 150. For example, the processor 151 may be an application processor (AP), a central processing unit (CPU), a microcontroller (MCU), etc.

A memory 153 that stores data required for the operation of the wearable electronic device 100 may be further disposed on the main board 150. For example, the memory 153 may store a boot image for booting the wearable electronic device 100, or may store data transmitted/received to/from an external device. For example, the memory 153 may include a volatile memory, such as a dynamic random access memory (DRAM), a static random access memory (SRAM), a mobile DRAM, DDR SDRAM, LPDDR SDRAM, GDDR SDRAM, RDRAM, etc., and/or a nonvolatile memory, such as an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

In some example embodiments, the processor 151 and the memory 153 may be packaged as package on package (PoP). In other example embodiments, the processor 151 and the memory 153 may be packaged in various forms, such as ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

In some example embodiments, various components, such as a power management integrated circuit (PMIC) 155, a sensor 157, an audio codec, a Bluetooth controller, etc., may be further disposed on the main board 150. For example, the sensor 157 may include an accelerometer, a gyroscope, a heart rate sensor, etc. In some example embodiments, the processor 151, the memory 153, the PMIC 155, the sensor 157, and the like may be disposed on one surface of the main board 150. In other example embodiments, as illustrated in FIG. 2, the processor 151, the memory 153, the PMIC 155, the sensor 157, and the like may be disposed on both surfaces of the main board 150.

The wearable electronic device 100 according to example embodiments may further include a loop antenna 130 located between the display panel 120 and the main board 150, and a near field communication (NFC) chip 170 connected to the loop antenna 130.

The loop antenna 130 may include a loop coil formed of a metal material, such as copper, silver, aluminum, etc. In some example embodiments, the loop coil of the loop antenna 130 may have two or more turns to have an inductance corresponding to a desired resonance frequency (e.g., about 13.56 MHz). According to example embodiments, the loop coil may have any shape, such as a circular shape, an elliptical shape, a rectangular shape, a polygonal shape, etc. In some example embodiments, in a case where the display panel 120 is a curved display panel having a curved surface, the loop antenna 130 also may be correspondingly curved.

In some example embodiments, the NFC chip 170 may transmit, via the loop antenna 130, the NFC signal at a frequency of 13.56 MHz. However, example embodiments are not limited thereto.

FIG. 3 is a diagram illustrating an example of a loop antenna included in a wearable electronic device according to example embodiments.

As illustrated in FIG. 3, the loop antenna 130 may be embodied as a loop antenna 200. The loop antenna 200 may include a loop coil 240 that is formed on a substrate 220 (or a film), and the loop coil 240 may have a circular shape. A first terminal T1 may be formed on one end of the loop coil 240, and a second terminal T2 may be formed on the other end of the loop coil 240. The first and second terminals T1 and T2 of the loop coil 240 may be connected to an NFC chip 250, and may serve as feeding points of the loop antenna 200. Thus, a current path (or a feeding loop) may be formed from the first terminal T1 through the loop coil 240 to the second terminal T2, and the NFC chip 250 may perform a near field communication by generating an electromagnetic field (or an RF field) using the current loop (or the feeding loop). In some example embodiments, a matching circuit for impedance matching may be disposed between the first and second terminals T1 and T2 and the NFC chip 250. According to example embodiments, the substrate 220 (or the film) on which the loop coil 240 is formed may be a flexible printed circuit board (FPCB), a printed circuit board (PCB), or any substrate or film. In some example embodiments, the loop coil 240 may be formed of any metal material having a high conductivity, such as copper, silver, aluminum, etc.

FIG. 4 is a diagram illustrating another example of a loop antenna included in a wearable electronic device according to example embodiments.

As illustrated in FIG. 4, the loop antenna 130 may be embodied as a loop antenna 300. The loop antenna 300 may include a loop coil 340 that is formed on a predetermined substrate 320 (or a film), and the loop coil 340 may have a rectangular shape. A first terminal T1 formed on one end of the loop coil 340 and a second terminal T2 formed on the other end of the loop coil 340 may be connected to an NFC chip 350.

Although FIGS. 3 and 4 illustrate the loop coils 240 and 340 having the circular shape and the rectangular shape, the shape of the loop coils 240 and 340 or the loop antenna 130 may not be limited thereto. Further, although FIGS. 3 and 4 illustrate the loop coils 240 and 340 having three turns, the number of turns of the loop coils 240 and 340 or the loop antenna 130 may not be limited thereto.

Referring back to FIG. 2, the NFC chip 170 connected to the loop antenna 130 may perform the near field communication by transmitting or receiving an NFC signal in a direction passing through the display panel 120 using the loop antenna 130. For example, the NFC chip 170 may transmit the NFC signal to an external wireless communication device located in the direction passing through the display panel 120, or in a direction in which an image is displayed by the display panel 120, by generating an electromagnetic field (or an RF field) using the loop antenna 130 located between the display panel 120 and the main board 150, and may receive the NFC signal by receiving an electromagnetic field (or an RF field) generated by the external wireless communication device located in the direction in which the image is displayed by the display panel 120. Since the loop antenna 130 is located between the display panel 120 and the main board 150, the electromagnetic field (or the RF field) generated by the loop antenna 130 may pass through the display panel 120, and the electromagnetic field (or the RF field) generated by the external wireless communication device located in the direction in which the image is displayed may pass through the display panel 120. Accordingly, the NFC chip 170 may transmit/receive the NFC signal to/from the external wireless communication device located in the direction in which the image is displayed.

As discussed later with reference to FIG. 16, the NFC chip 170 may include an NFC controller connected to the loop antenna 130. The NFC controller may transmit or receive the NFC signal to perform the near field communication by controlling the loop antenna 130. In some example embodiments, the NFC chip 170 may further include a secure storage device connected to the NFC controller. The secure storage device may store information transferred to an external device through the near field communication. For example, the secure storage device may store payment information (e.g., credit card information), an encryption key, etc. For example, the secure storage device may be an embedded secure element (eSE). In some example embodiments, the NFC controller and the secure storage device may be packaged as one chip 170 using a system in package (SIP) technique. In some example embodiments, the NFC chip 170 may be disposed on the main board 150 as illustrated in FIG. 2, but example embodiments are not limited thereto.

A conventional wearable electronic device may not have a near field communication functionality or may have an NFC antenna located at a back surface of a wearable electronic device opposite to a front surface of the wearable electronic device where a display panel is located, or where a battery of the wearable electronic device is located. Therefore, the user may need to remove the wearable electronic device to perform the near field communication. In contrast, the wearable electronic device 100 according to example embodiments may transmit/receive the NFC signal to/from the external device located in front of the display panel 120 of the wearable electronic device 100, and thus the near field communication may be performed while the wearable electronic device 100 is being worn by a user.

As described above, in the wearable electronic device 100 according to example embodiments, the loop antenna 130 may be located between the display panel 120 and the main board 150, and thus the electromagnetic field (or the RF field) may be formed by passing through the display panel 120. Accordingly, the wearable electronic device 100 according to example embodiments may transmit/receive the NFC signal to/from the external device located in front of the display panel 120 of the wearable electronic device 100, and may perform the near field communication while being worn.

Figure 5:
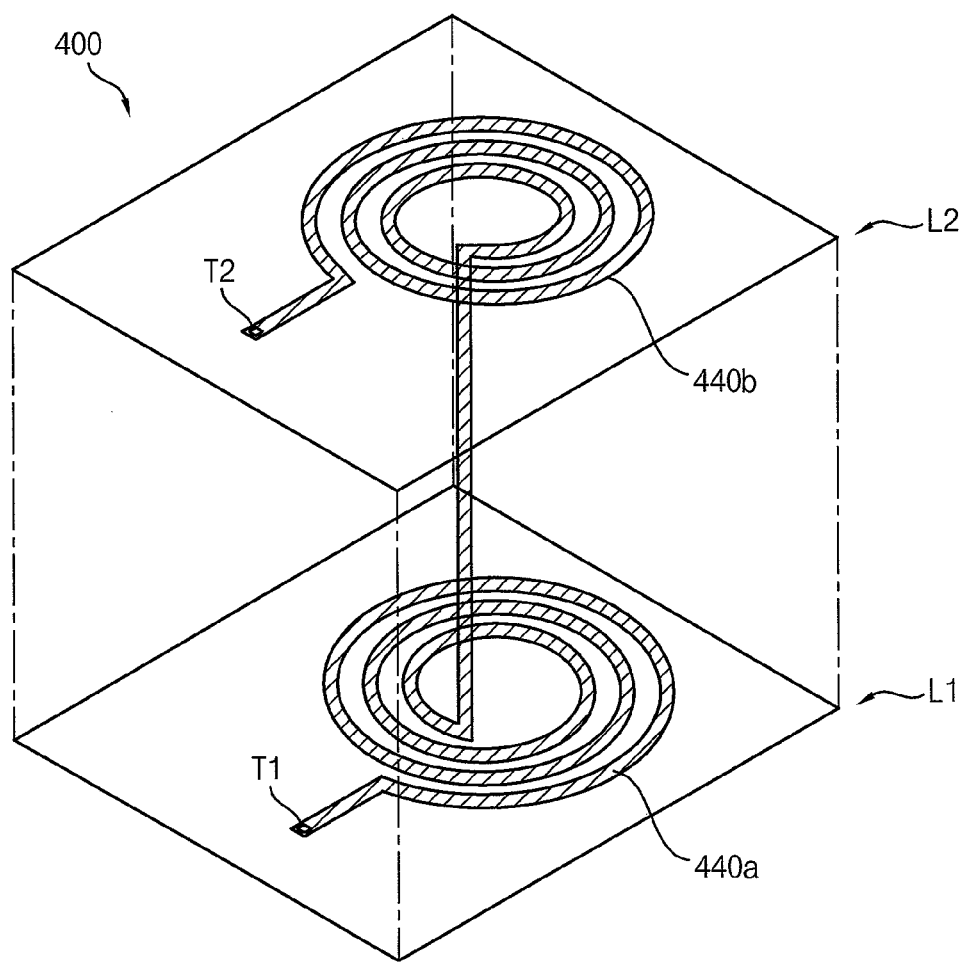
FIG. 5 is a diagram illustrating still another example of a loop antenna included in a wearable electronic device according to example embodiments.

FIG. 5 is a diagram illustrating still another example of a loop antenna included in a wearable electronic device according to example embodiments.

Referring to FIG. 5, the loop antenna 130 may be embodied as a loop antenna 400. The loop antenna 400 employed in a wearable electronic device according to example embodiments may include a loop coil 440a and 440b having a multi-layer structure. That is, the loop coil 440a and 440b may be formed at two or more layers L1 and L2. For example, the loop antenna 400 may include a first loop coil 440a formed at a first layer L1, and a second loop coil 440b connected to the first loop coil 440a and formed at a second layer L2. A first terminal T1 may be formed at one end of the first and second loop coils 440a and 440b, and a second terminal T2 may be formed at the other end of the first and second loop coils 440a and 440b. The first and second terminals T1 and T2 may be connected to an NFC chip, and may serve as feeding points of the loop antenna 400. Thus, a current path (or a feeding loop) may be formed from the first terminal T1 through first and second loop coils 440a and 440b to the second terminal T2, and the NFC chip may perform a near field communication by generating an electromagnetic field (or an RF field) using the current loop (or the feeding loop).

Although FIG. 5 illustrates an example of the loop coil 440a and 440b formed at the two layers L1 and L2, in some example embodiments, the loop coil 440a and 440b may be formed at three or more layers. According to example embodiments, to form the loop coil 440a and 440b having the multi-layer structure, the first and second loop coils 440a and 440b may be disposed on opposite surfaces of the same substrate (or film), or may be disposed on different substrates (or films).

Figure 6:
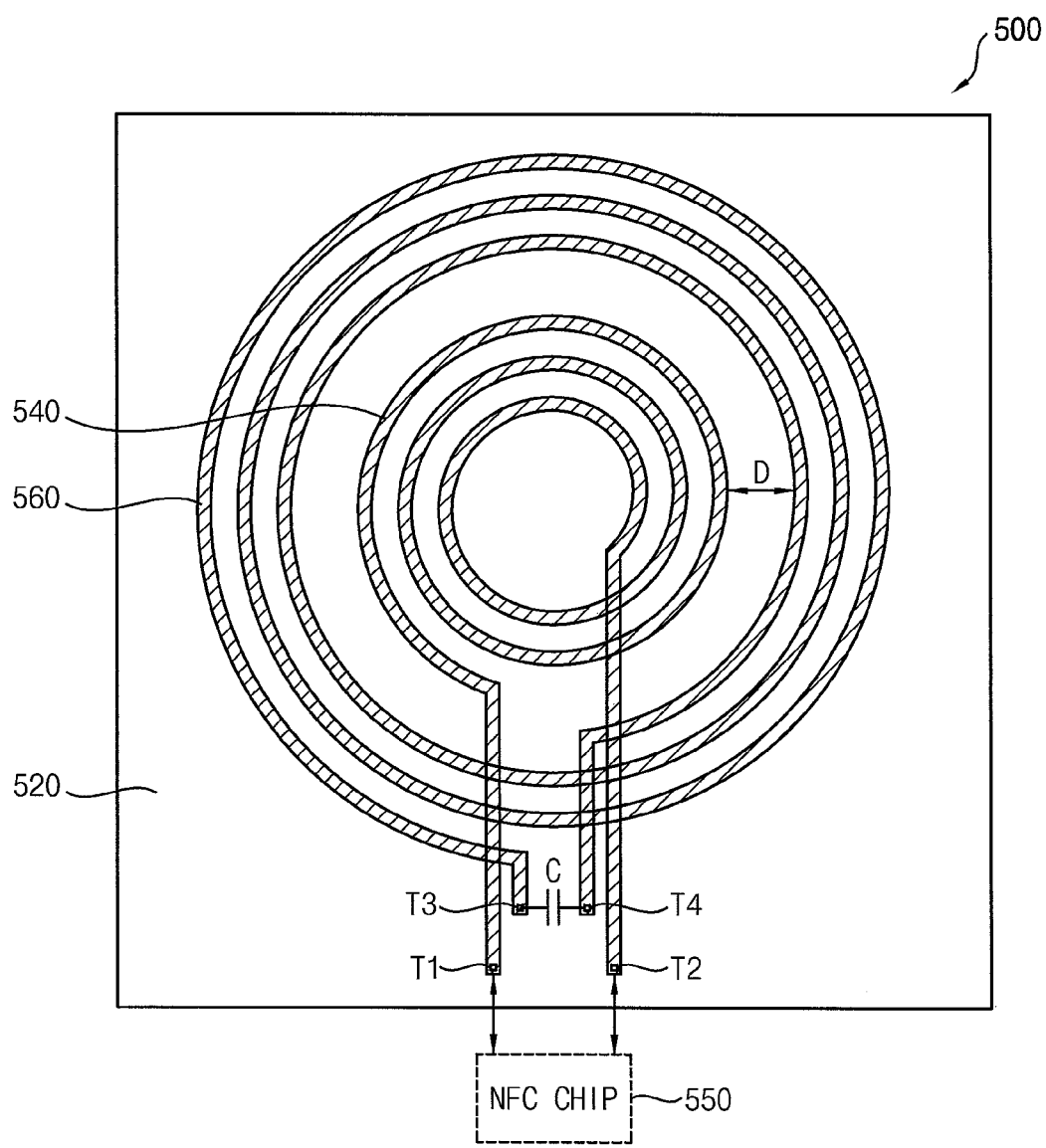
FIG. 6 is a diagram illustrating still another example of a loop antenna included in a wearable electronic device according to example embodiments.

FIG. 6 is a diagram illustrating still another example of a loop antenna included in a wearable electronic device according to example embodiments.

Referring to FIG. 6, in some example embodiments, the loop antenna 130 may be embodied as a loop antenna 500. The loop antenna 500 may include a loop coil 540 formed on a substrate 520 (or a film), and a secondary loop coil 560 spaced apart from the loop coil 540. The loop coil 540 and the secondary loop coil 560 may be formed on the same substrate 520 (or the same film), and the secondary loop coil 560 may be located to surround the loop coil 540.

A first terminal T1 may be formed at one end of the loop coil 540, and a second terminal T2 may be formed at the other end of the loop coil 540. The first and second terminals T1 and T2 of the loop coil 540 may be connected to an NFC chip, and may serve as feeding points of the loop antenna 500. Thus, a current path (or a feeding loop) may be formed from the first terminal T1 through the loop coil 540 to the second terminal T2, and the NFC chip may perform a near field communication by generating an electromagnetic field (or an RF field) using the current loop (or the feeding loop).

The secondary loop coil 560 may be connected to an appropriate capacitor C (e.g., a chip capacitor) to have a desired resonance frequency (e.g., about 13.56 MHz). For example, a third terminal T3 may be formed at one end of the secondary loop coil 560, a fourth terminal T4 may be formed at the other end of the secondary loop coil 560, and the capacitor C may be connected between the third and fourth terminals T3 and T4 of the secondary loop coil 560. The secondary loop coil 560 and the loop coil 540 may be mutual-inductively coupled (or magnetically coupled). To achieve this inductive coupling, the loop coil 540 and the secondary loop coil 560 may have a desired (or, alternatively a predetermined) distance D (or gap). For example, the distance D between the loop coil 540 and the secondary loop coil 560 may be greater than about 0 mm and less than about 2 mm. Thus, the secondary loop coil 560 and the capacitor C may form a resonance loop having the desired resonance frequency (e.g., about 13.56 MHz), and may generate an electromagnetic field (or an RF field) because of the inductive coupling with the loop coil 540. Accordingly, by the secondary loop coil 560 magnetically coupled to the loop coil 540, electromagnetic field radiation efficiency or a quality (Q) factor of the loop antenna 500 may be improved.

Figure 7:
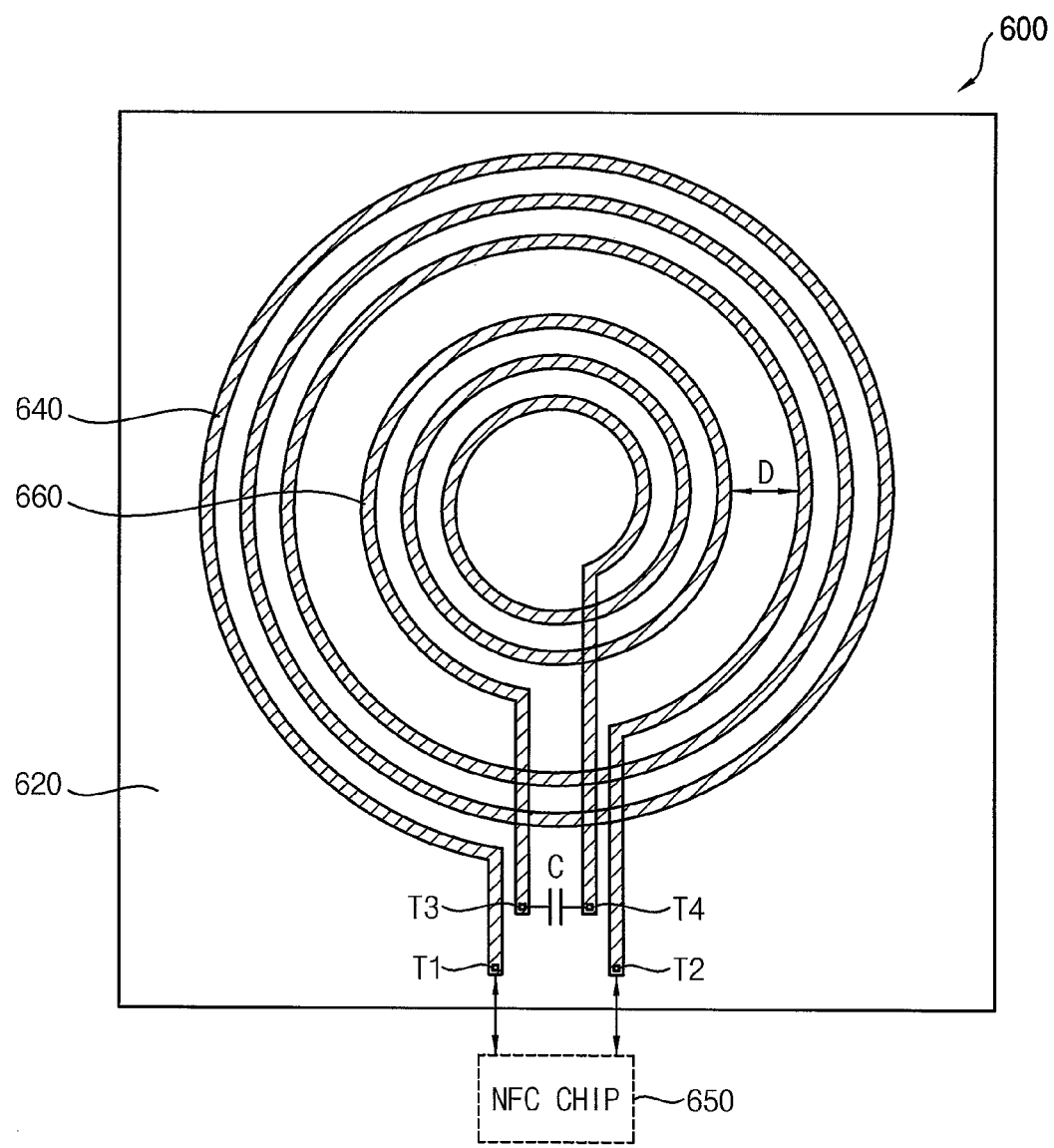
FIG. 7 is a diagram illustrating still another example of a loop antenna included in a wearable electronic device according to example embodiments.

FIG. 7 is a diagram illustrating still another example of a loop antenna included in a wearable electronic device according to example embodiments.

Referring to FIG. 7, in some example embodiments, the loop antenna 130 may be embodied as a loop antenna 600. The loop antenna 600 may include a loop coil 640 formed on a substrate 620 (or a film), and a secondary loop coil 660 spaced apart from the loop coil 640. First and second terminals T1 and T2 of the loop coil 640 may be connected to an NFC chip. A capacitor C may be connected between third and fourth terminals T3 and T4 of the secondary loop coil 660 for the secondary loop coil 660 to have a desired resonance frequency (e.g., about 13.56 MHz). The loop coil 640 and the secondary loop coil 660 may be formed on the same substrate 620 (or the same film). In contrast to the loop antenna 500, the loop antenna 600 may be configured such that the loop coil 640 may surround the secondary loop coil 660. By the secondary loop coil 660 magnetically coupled to the loop coil 640, electromagnetic field radiation efficiency or a quality (Q) factor of the loop antenna 600 may be improved.

Figure 8:
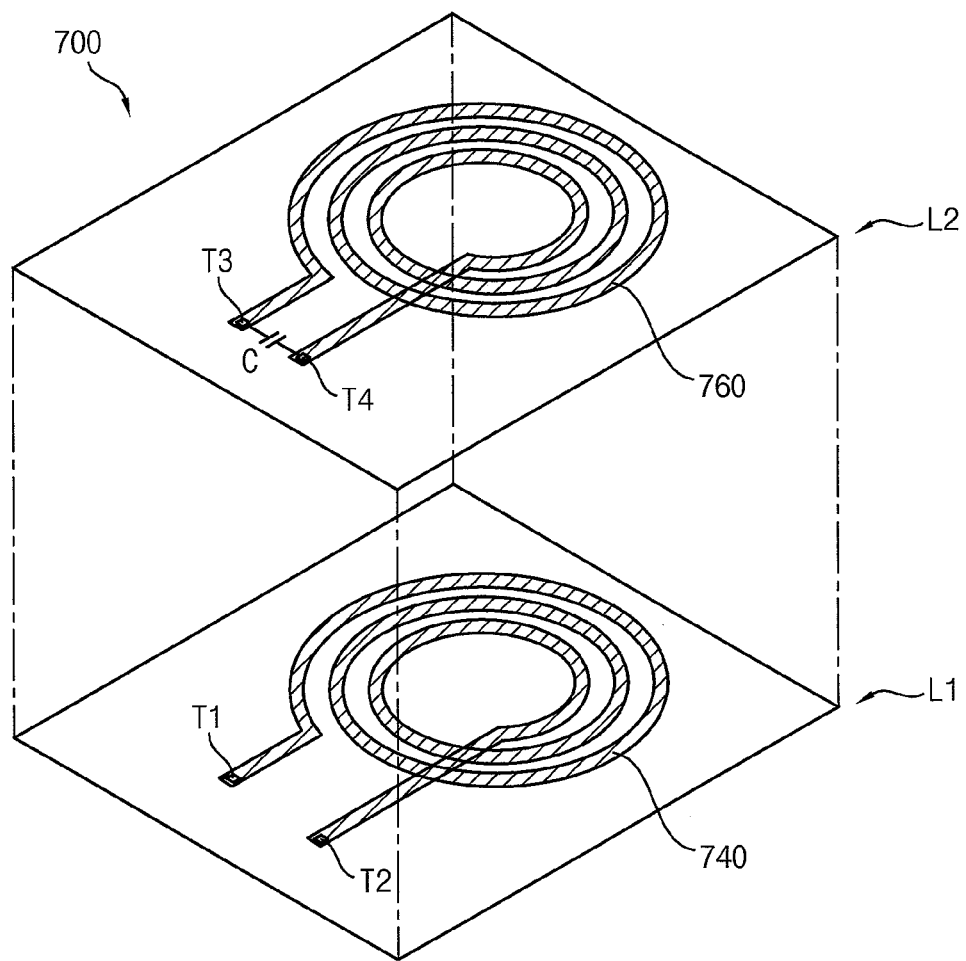
FIG. 8 is a diagram illustrating still another example of a loop antenna included in a wearable electronic device according to example embodiments.

FIG. 8 is a diagram illustrating still another example of a loop antenna included in a wearable electronic device according to example embodiments.

Referring to FIG. 8, in some example embodiments, the loop antenna 130 may be embodied as a loop antenna 700. The loop antenna 700 employed in a wearable electronic device according to example embodiments may include a loop coil 740 and a secondary loop coil 760 formed at different layers L1 and L2. For example, the loop antenna 700 may include the loop coil 740 formed at a first layer L1, and the secondary loop coil 760 magnetically coupled to the loop coil 740 and formed at a second layer L2. First and second terminals T1 and T2 of the loop coil 740 may be connected to an NFC chip. A capacitor C may be connected between third and fourth terminals T3 and T4 of the secondary loop coil 760 for the secondary loop coil 760 to have a desired resonance frequency (e.g., about 13.56 MHz). By the secondary loop coil 760 magnetically coupled to the loop coil 740, electromagnetic field radiation efficiency or a quality (Q) factor of the loop antenna 700 may be improved. According to example embodiments, the loop coil 740 and the secondary loop coil 760 may be disposed on opposite surfaces of the same substrate (or film), or may be disposed on different substrates (or films).

Figure 9:
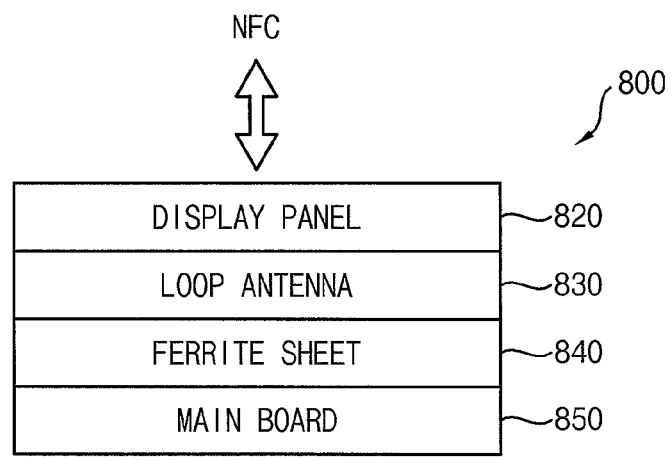
FIG. 9 is a diagram for describing a configuration of a wearable electronic device according to example embodiments.

FIG. 9 is a diagram for describing a configuration of a wearable electronic device according to example embodiments.

Referring to FIG. 9, in some example embodiments, the wearable electronic device 100 may be embodied as a wearable electronic device 800. The wearable electronic device 800 may include a display panel 820 that displays an image, a main board 850 on which a processor that controls an operation of the wearable electronic device 800 is disposed, a loop antenna 830 located between the display panel 820 and the main board 850, and a magnetic sheet 840 located between the loop antenna 830 and the main board 850. Compared with a wearable electronic device 100 of FIG. 2, the wearable electronic device 800 may further include the magnetic sheet 840.

The magnetic sheet 840 may improve electromagnetic field radiation efficiency of the loop antenna 830 by preventing an electromagnetic field for a near field communication from being reduced by an eddy current caused by a change of the electromagnetic field at the main board 850. For example, the magnetic sheet 840 may be a ferrite sheet or a magneto-dielectric material (MDM) sheet.

Figure 10:
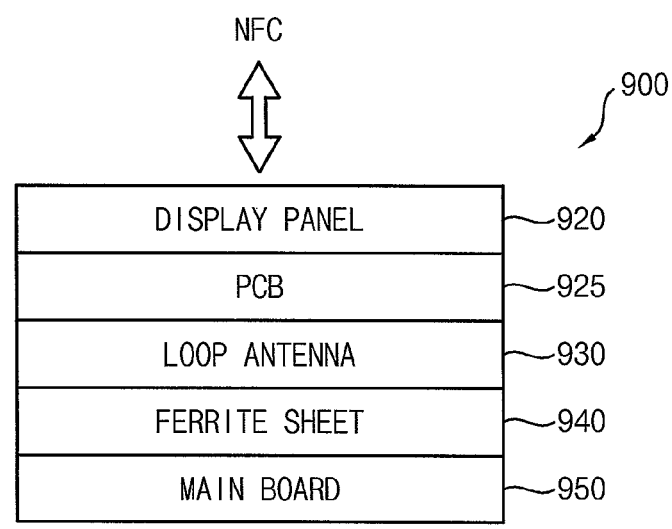
FIG. 10 is a diagram for describing a configuration of a wearable electronic device according to example embodiments.

FIG. 10 is a diagram for describing a configuration of a wearable electronic device according to example embodiments.

Referring to FIG. 10, in some example embodiments, the wearable electronic device 100 may be embodied as a wearable electronic device 900. The wearable electronic device 900 may include a display panel 920 that displays an image, a main board 950 on which a processor that controls an operation of the wearable electronic device 900 is disposed, a printed circuit board (PCB) 925 that connects the display panel 920 and the main board 950, and a loop antenna 930.

The PCB 925 may connect the display panel 920 and the main board 950, and passive elements and/or chips for driving the display panel 920 may be disposed on the PCB 925.

The loop antenna 930 may be located between the PCB 925 and the main board 950. Accordingly, an electromagnetic field (or an RF field) may be formed such that the electromagnetic field passes through the display panel 920 and the PCB 925, and the wearable electronic device 900 may perform a near field communication while being worn.

In some example embodiments, the wearable electronic device 900 may further include a magnetic sheet 940 located between the loop antenna 930 and the main board 950. The magnetic sheet 940 may improve electromagnetic field radiation efficiency of the loop antenna 930 by preventing the electromagnetic field for the near field communication from being reduced by an eddy current caused by a change of the electromagnetic field at the main board 950.

Figure 11:
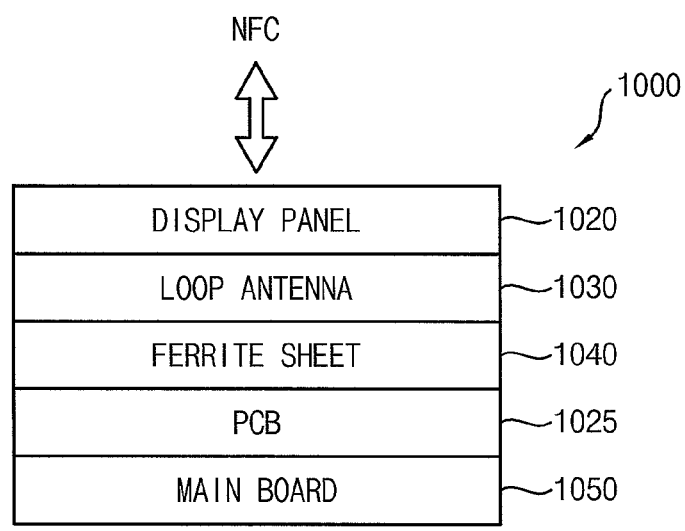
FIG. 11 is a diagram for describing a configuration of a wearable electronic device according to example embodiments.

FIG. 11 is a diagram for describing a configuration of a wearable electronic device according to example embodiments.

Referring to FIG. 11, in some example embodiments, the wearable electronic device 100 may be embodied as a wearable electronic device 1000. The wearable electronic device 1000 may include a display panel 1020 that displays an image, a main board 1050 on which a processor that controls an operation of the wearable electronic device 1000 is disposed, a PCB 1025 that connects the display panel 1020 and the main board 1050, and a loop antenna 1030 located between the display panel 1020 and the main board 1050. Since the loop antenna 1030 is located between the display panel 1020 and the main board 1050, an electromagnetic field (or an RF field) may be formed such that the electromagnetic field passes through the display panel 1020, and the wearable electronic device 1000 may perform a near field communication while being worn.

In some example embodiments, the wearable electronic device 1000 may further include a magnetic sheet 1040 located between the loop antenna 1030 and the PCB 1025. The magnetic sheet 1040 may improve electromagnetic field radiation efficiency of the loop antenna 1030 by preventing the electromagnetic field for the near field communication from being reduced by an eddy current caused by a change of the electromagnetic field at the PCB 1025 and the main board 1050.

Figure 12:
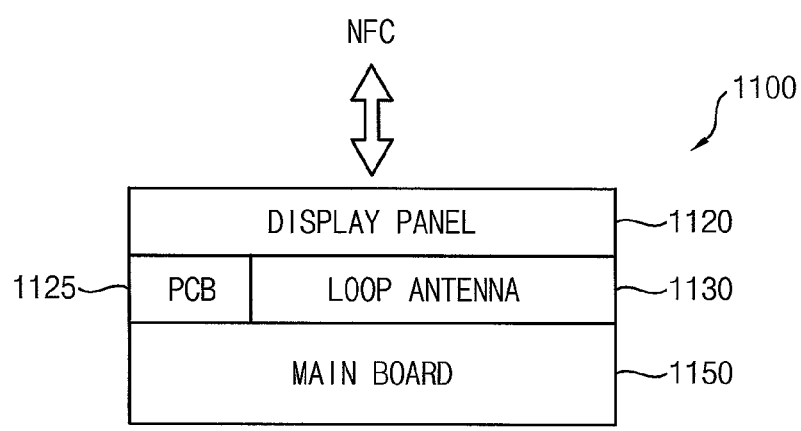
FIG. 12 is a diagram for describing a configuration of a wearable electronic device according to example embodiments.

FIG. 12 is a diagram for describing a configuration of a wearable electronic device according to example embodiments.

Referring to FIG. 12, in some example embodiments, the wearable electronic device 100 may be embodied as a wearable electronic device 1100. The wearable electronic device 1100 may include a display panel 1120 that displays an image, a main board 1150 on which a processor that controls an operation of the wearable electronic device 1100 is disposed, a PCB 1125 that connects the display panel 1120 and the main board 1150, and a loop antenna 1130. The PCB 1125 may be disposed on a first portion of a back surface of the display panel 1120, and the loop antenna 1130 may be disposed on a second portion of the back surface of the display panel 1120 such that the loop antenna 1130 does not overlap the PCB 1125. Accordingly, the loop antenna 1130 may not be substantially affected by the PCB 1125. Since the loop antenna 1130 is disposed on the portion of the back surface of the display panel 1120 such that the loop antenna 1130 does not overlap the PCB 1125, the loop antenna 1130 may not be substantially affected by any eddy current at the PCB 1125, and an electromagnetic field (or an RF field) may be formed by the loop antenna 1130 such that the electromagnetic field passes through the display panel 1120. Accordingly, the wearable electronic device 1100 may perform a near field communication while being worn. In some example embodiments, a magnetic sheet may be further formed on a back surface of the loop antenna 1130.

Figure 13:
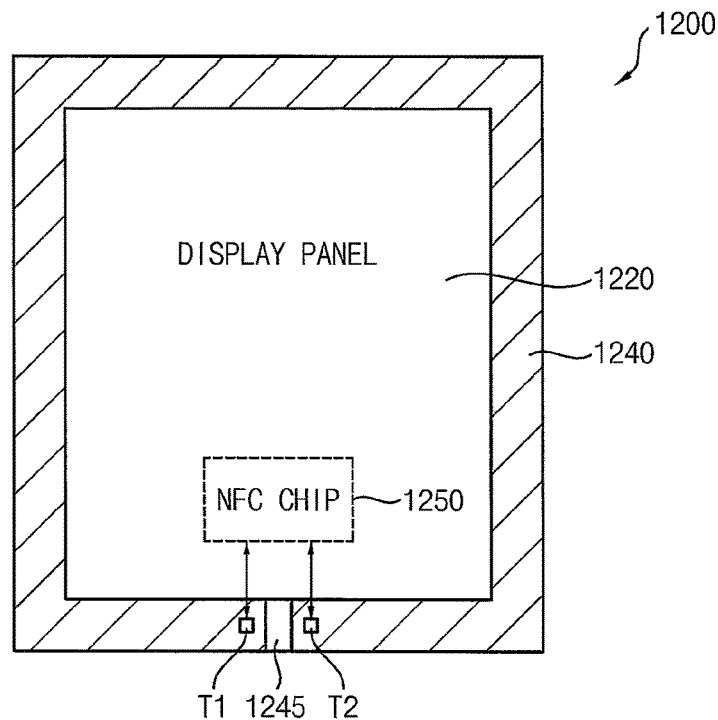
FIG. 13 is a diagram for describing a configuration of a wearable electronic device according to example embodiments.

FIG. 13 is a diagram for describing a configuration of a wearable electronic device according to example embodiments.

Referring to FIG. 13, in some example embodiments, the wearable electronic device 100 may be embodied as a wearable electronic device 1200. The wearable electronic device 1200 according to example embodiments may include a metal frame 1240 defining a perimeter of the wearable electronic device 1200, and an NFC chip 1250 connected to the metal frame 1240. The wearable electronic device 1200 may further include a display panel 1220 that displays an image, and a main board (not shown) on which a processor that controls an operation of the wearable electronic device 1200 is disposed.

At least a portion of the metal frame 1240 may be formed of a metal material having a desired strength and a desired electrical conductivity. For example, the metal frame 1240 may include at least one of copper (Cu), aluminum (Al), iron (Fe), titanium (Ti), silver (Ag), palladium (Pd), platinum (Pt), aurum (Au), nickel (Ni) and the like. Since at least the portion of the metal frame 1240 is formed of the metal material, the wearable electronic device 1200 may have an improved strength and a good appearance.

The metal frame 1240 may include first and second terminals T1 and T2 located adjacent to each other, and at least one slit 1245 located between the first and second terminals T1 and T2. The first and second terminals T1 and T2 of the metal frame 1240 may be connected to an NFC chip 1250, and may serve as feeding points. Thus, a current path (or a feeding loop) may be formed from the first terminal T1 through the metal frame 1240 to the second terminal T2, and the NFC chip 1250 may perform a near field communication by generating an electromagnetic field (or an RF field) using the current loop (or the feeding loop). According to example embodiments, the slit 1245 may be formed at any position of the metal frame 1240, and the first and second terminals T1 and T2 may be located adjacent to each other such that the slit 1245 is located between the first and second terminals T1 and T2. In some example embodiments, a matching circuit for impedance matching may be disposed between the first and second terminals T1 and T2 and the NFC chip 1250.

In some example embodiments, the slit 1245 may be filled with an insulator (or a dielectric). For example, the insulator may include a polyimide, a plastic, a polymer, a ceramic, a glass, or the like.

The NFC chip 1250 may be connected to the terminals of the metal frame 1240, and may use the metal frame 1240 as an NFC antenna (e.g., a feeding loop). Thus, to perform the near field communication, the NFC chip 1250 may radiate the electromagnetic field (or the RF field) in all directions including a direction in which the image is displayed by the display panel 1220 by using the metal frame 1240 at the perimeter of the wearable electronic device 1200.

In other example embodiments, the wearable electronic device 1200 may further include a loop antenna located between the display panel 1220 and the main board, and the metal frame 1240 may be connected to the loop antenna. In this case, the NFC chip 1250 may transmit or receive the NFC signal using both of the metal frame 1240 and the loop antenna as the NFC antenna (e.g., the feeding loop).

As described above, the wearable electronic device 1200 according to example embodiments may perform the near field communication using the metal frame 1240 and/or the loop antenna, and thus may perform the near field communication while being worn.

Figure 14:
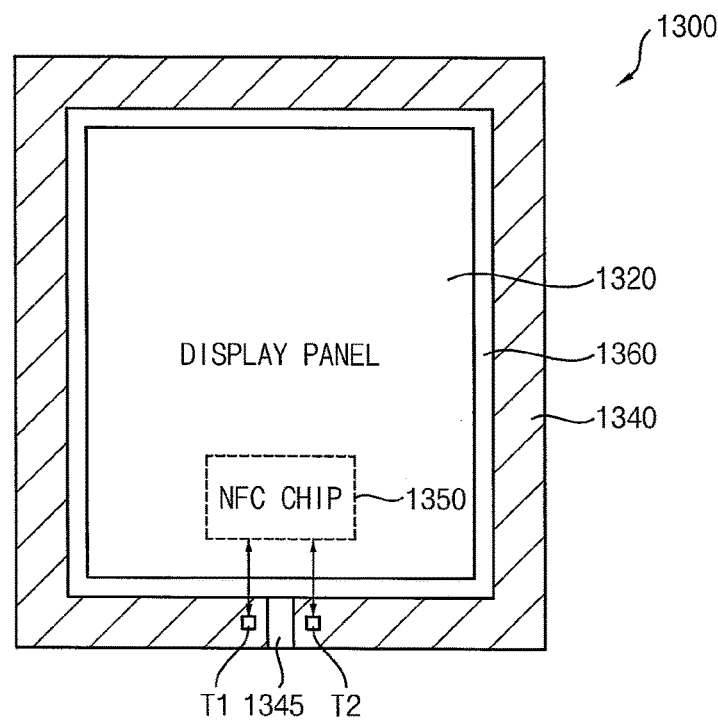
FIG. 14 is a diagram for describing a configuration of a wearable electronic device according to example embodiments.

FIG. 14 is a diagram for describing a configuration of a wearable electronic device according to example embodiments.

Referring to FIG. 14, in some example embodiments, the wearable electronic device 100 may be embodied as a wearable electronic device 1300. The wearable electronic device 1300 according to example embodiments may include a metal frame 1340 that defines a perimeter of the wearable electronic device 1300, that includes a metal material, and that has first and second terminals T1 and T2 located adjacent to each other and a slit 1345 located between the first and second terminals T1 and T2, an NFC chip 1350 that is connected to the first and second terminals T1 and T2 of the metal frame 1340, and that performs a near field communication by transmitting or receiving an NFC signal using the metal frame 1340, and a magnetic sheet 1360 that is disposed on an inner surface of the metal frame 1340. The wearable electronic device 1300 may further include a display panel 1320 that displays an image, a main board on which a processor that controls an operation of the wearable electronic device 1300 is disposed. Compared with a wearable electronic device 1200 of FIG. 13, the wearable electronic device 1300 may further include the magnetic sheet 1360.

In some example embodiments where the metal frame 1340 is used as an NFC antenna (e.g., a feeding loop), the magnetic sheet 1360 may allow metal components at an internal space defined by the metal frame 1340 not to affect the metal frame 1340, thereby improving electromagnetic field radiation efficiency of the metal frame 1340. In other example embodiments where a loop antenna located between the display panel 1320 and the main board is used as an NFC antenna (e.g., a feeding loop), the magnetic sheet 1360 may allow the metal frame 1340 not to affect the loop antenna, thereby improving electromagnetic field radiation efficiency of the loop antenna.

Figure 15:
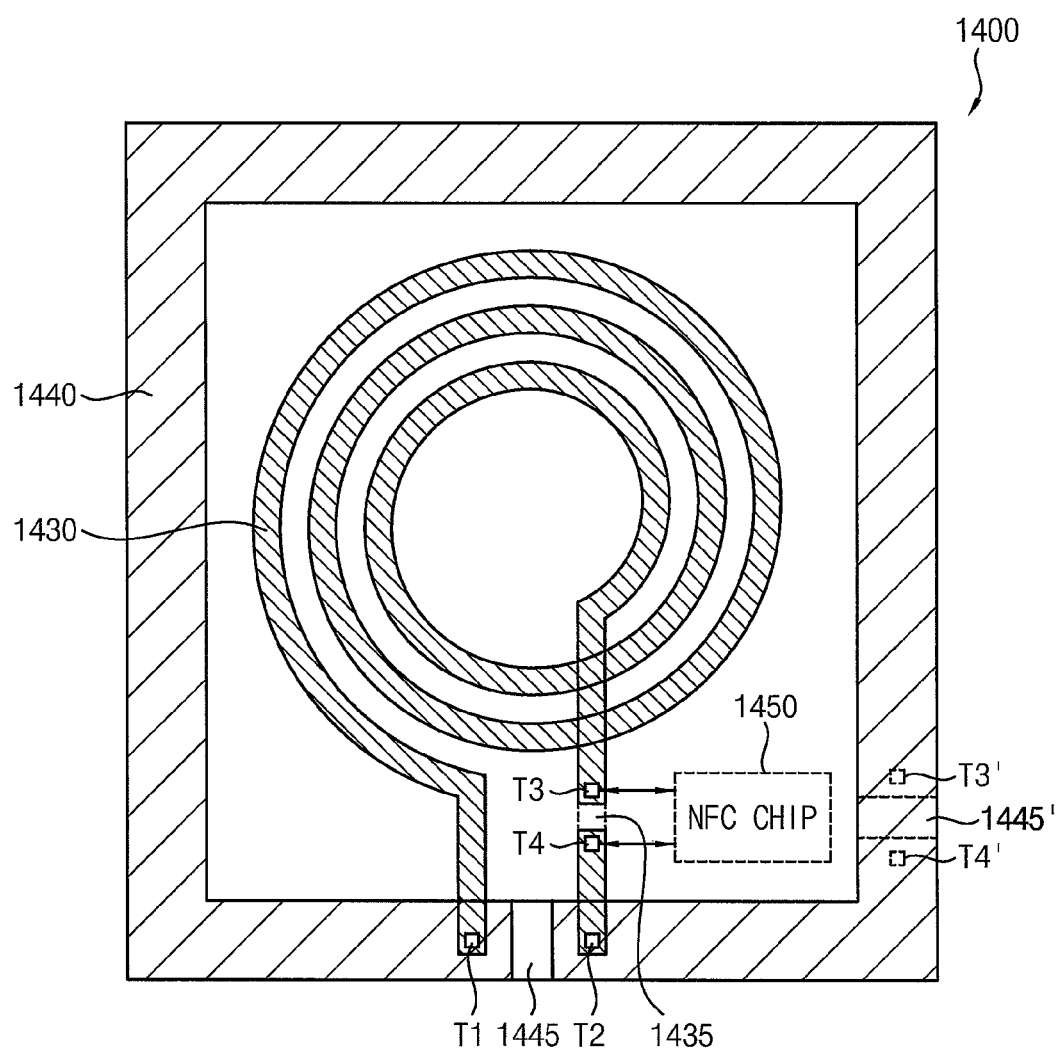
FIG. 15 is a diagram illustrating an example where a loop antenna and a metal frame are connected to each other in a wearable electronic device according to example embodiments.

FIG. 15 is a diagram illustrating an example where a loop antenna and a metal frame are connected to each other in a wearable electronic device according to example embodiments.

Referring to FIG. 15, in some example embodiments, the wearable electronic device 100 may be embodied as a wearable electronic device 1400. The wearable electronic device 1400 according to example embodiments may include a display panel that displays an image, a main board on which a processor that controls an operation of the wearable electronic device 1400 is disposed, a metal frame 1440 defining a perimeter of the wearable electronic device 1400, a loop antenna 1430 located between the display panel and the main board, and an NFC chip 1450 connected to the metal frame 1440 and the loop antenna 1430.

The loop antenna 1430 and the metal frame 1440 may be connected to each other. For example, the metal frame 1440 may including first and second terminals T1 and T2 having a first slit 1445 therebetween, and the loop antenna 1430 may be connected to the first and second terminals T1 and T2 of the metal frame 1440. Thus, the loop antenna 1430 and the metal frame 1440 may form one loop.

In some example embodiments, the loop antenna 1430 may have third and fourth terminals T3 and T4 located adjacent to each other and a cut portion 1435 located between the third and fourth terminals T3 and T4, and the NFC chip 1450 may be connected to the loop antenna 1430 and the metal frame 1440 through the third and fourth terminals T3 and T4 of the loop antenna 1430. Thus, the third and fourth terminals T3 and T4 may serve as feeding points, and a current path (or a feeding loop) may be formed from the third terminal T3 through the loop antenna 1430 and the metal frame 1440 to the fourth terminal T4. The NFC chip 1450 may perform a near field communication by generating an electromagnetic field (or an RF field) using the current loop (or the feeding loop) including the loop antenna 1430 and the metal frame 1440. Thus, to perform the near field communication, the NFC chip 1450 may transmit or receive the NFC signal using both of the loop antenna 1430 and the metal frame 1440 as one feeding loop. According to example embodiments, the cut portion 1435 may be formed at any position of the loop antenna 1430, and the third and fourth terminals T3 and T4 may be located adjacent to each other such that the cut portion 1435 at any position is located between the third and fourth terminals T3 and T4. In some example embodiments, a matching circuit for impedance matching may be disposed between the third and fourth terminals T3 and T4 and the NFC chip 1450.

In other example embodiments, the loop antenna 1430 may not have the cut portion 1435, the third terminal T3 and the fourth terminal T4, and the metal frame 1440 may have the third and fourth terminals T3' and T4' located adjacent to each other and a second slit 1445' located between the third and fourth terminals T3' and T4'. The NFC chip 1450 may be connected to the loop antenna 1430 and the metal frame 1440 through the third and fourth terminals T3' and T4' of the metal frame 1440. The NFC chip 1450 may perform a near field communication by generating an electromagnetic field (or an RF field) using both of the loop antenna 1430 and the metal frame 1440 as one feeding loop. According to example embodiments, the second slit 1445' may be formed at any position of the metal frame 1440, and the third and fourth terminals T3' and T4' may be located adjacent to each other such that the second slit 1445' at any position is located between the third and fourth terminals T3' and T4'.

As described above, the NFC chip 1450 may perform the near field communication using both of the loop antenna 1430 and the metal frame 1440 as one feeding loop. Accordingly, since both of the loop antenna 1430 and the metal frame 1440 is used as the NFC antenna, electromagnetic field radiation efficiency of the NFC antenna may be improved.

Figure 16:
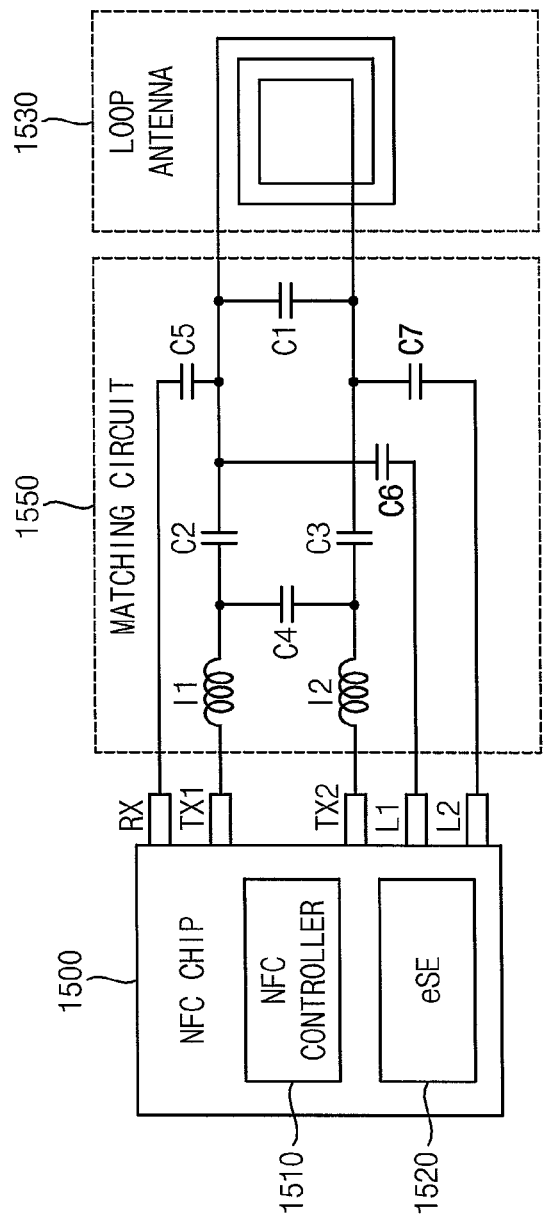
FIG. 16 is a diagram for describing a near field communication (NFC) device according to example embodiments.

FIG. 16 is a diagram for describing a near field communication (NFC) device according to example embodiments.

Referring to FIG. 16, an NFC device includes an NFC chip 1500 and an NFC antenna (e.g., a loop antenna 1530 and/or a metal frame). The NFC device (or the NFC chip 1500) may be embedded in a wearable electronic device according to example embodiments. The NFC chip 1500 may include an NFC controller 1510 that performs a near field communication by transmitting or receiving an NFC signal using the NFC antenna.

In some example embodiments the NFC controller 1510 may include a processor and a memory (not shown).

The memory may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

The processor may be, a central processing unit (CPU), a controller, or an application-specific integrated circuit (ASIC), that, when executing instructions stored in the memory, configures the processor as a special purpose computer configured to perform near field communication by transmitting or receiving the NFC signal while the wearable electronic device is being worn. In other example embodiments, the NFC controller 1510 may include a circuit including hardware devices configured to perform the near field communication while the wearable electronic device is being worn.

The NFC chip 1500 (or the NFC device) may improve the function of the wearable electronic device itself by allowing the wearable electronic device to transmit or receive NFC signals without requiring extra time for the user to remove the wearable electronic device.

In some example embodiments, the NFC chip 1500 may be connected to the loop antenna 1530 located between a display panel and a main board, the NFC controller 1510 of the NFC chip 1500 may perform the near field communication by transmitting or receiving the NFC signal in a direction passing through the display panel using the loop antenna 1530. Accordingly, the NFC chip 1500 may perform the near field communication with an external wireless communication device located in front of the display panel, and may perform the near field communication while the wearable electronic device is being worn.

In other example embodiments, the NFC chip 1500 may be connected to the metal frame surrounding the display panel, and the NFC controller 1510 of the NFC chip 1500 may perform the near field communication by transmitting or receiving the NFC signal using the metal frame. The NFC signal may be transmitted in all directions by the metal frame, and thus the NFC chip 1500 may perform the near field communication with an external wireless communication device located at any position. Accordingly, the near field communication may be performed while the wearable electronic device is being worn.

In some example embodiments, in an NFC card mode, the NFC chip 1500 may perform a transmission operation and a reception operation through a first power terminal L1 and a second power terminal L2. In an NFC reader mode, the NFC chip 1500 may perform a transmission operation through a first transmission terminal TX1 and a second transmission terminal TX2, and may perform a reception operation through a reception terminal RX.

In some example embodiments, a matching circuit 1550 may be connected between the NFC chip 1500 and the loop antenna 1530 (or the metal frame). The matching circuit 1550 may perform impedance matching between the NFC chip 1500 and the loop antenna 1530 (or the metal frame).

For example, the matching circuit 1550 may include a first capacitor C1, a second capacitor C2, a third capacitor C3, a fourth capacitor C4, a fifth capacitor C5, a sixth capacitor C6, a seventh capacitor C7, a first inductor I1 and a second inductor I2. The first capacitor C1 may be connected between first and second terminals of the loop antenna 1530 (or the metal frame), the second capacitor C2 may be connected between the first terminal of the loop antenna 1530 (or the metal frame) and a first node, a third capacitor C3 may be connected between the second terminal of the loop antenna 1530 (or the metal frame) and a second node, and the fourth capacitor C4 may be connected between the first node and the second node. The first inductor I1 may be connected between the first node and the first transmission terminal TX1 of the NFC chip 1500, and the second inductor I2 may be connected between the second node and the second transmission terminal TX2 of the NFC chip 1500. The fifth capacitor C5 may be connected between the first terminal of the loop antenna 1530 (or the metal frame) and the reception terminal RX of the NFC chip 1500. The sixth capacitor C6 may be connected between the first terminal of the loop antenna 1530 (or the metal frame) and the first power terminal L1 of the NFC chip 1500, and the seventh capacitor C7 may be connected between the second terminal of the loop antenna 1530 (or the metal frame) and the second power terminal L2 of the NFC chip 1500. However, this configuration of the matching circuit 1550 illustrated in FIG. 16 is only one example, and the matching circuit 1550 for impedance matching between the NFC chip 1500 and the loop antenna 1530 (or the metal frame) may have various configurations according to example embodiments.

In some example embodiments, the NFC chip 1500 may further include a secure storage device 1520 connected to the NFC controller 1510. The secure storage device 1520 may store information transferred to an external device through the near field communication. For example, the secure storage device 1520 may store payment information (e.g., credit card information), an encryption key, etc. For example, the secure storage device 1520 may be an embedded secure element (eSE). In some example embodiments, the NFC controller 1510 and the secure storage device 1520 may be packaged as one chip 1500 using a system in package (SIP) technique.

Figure 17:
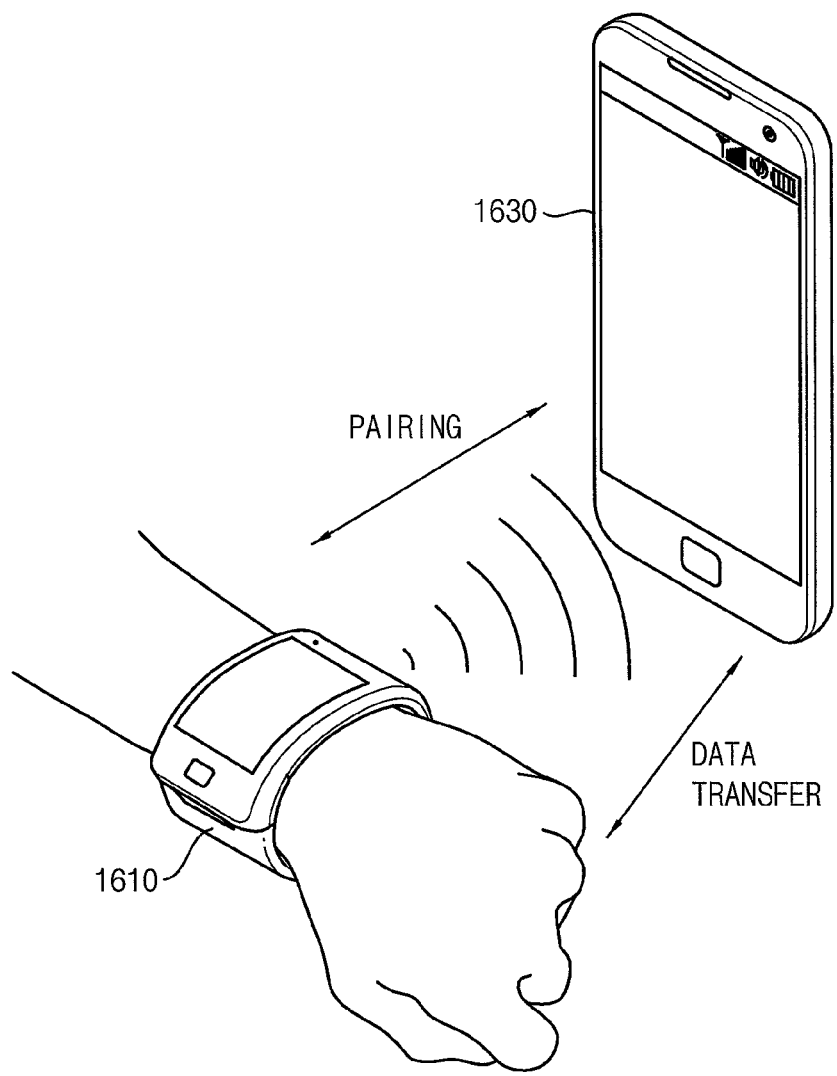
FIG. 17 is a diagram for describing an example of a wearable electronic device performing a near field communication according to example embodiments.
Figure 18:
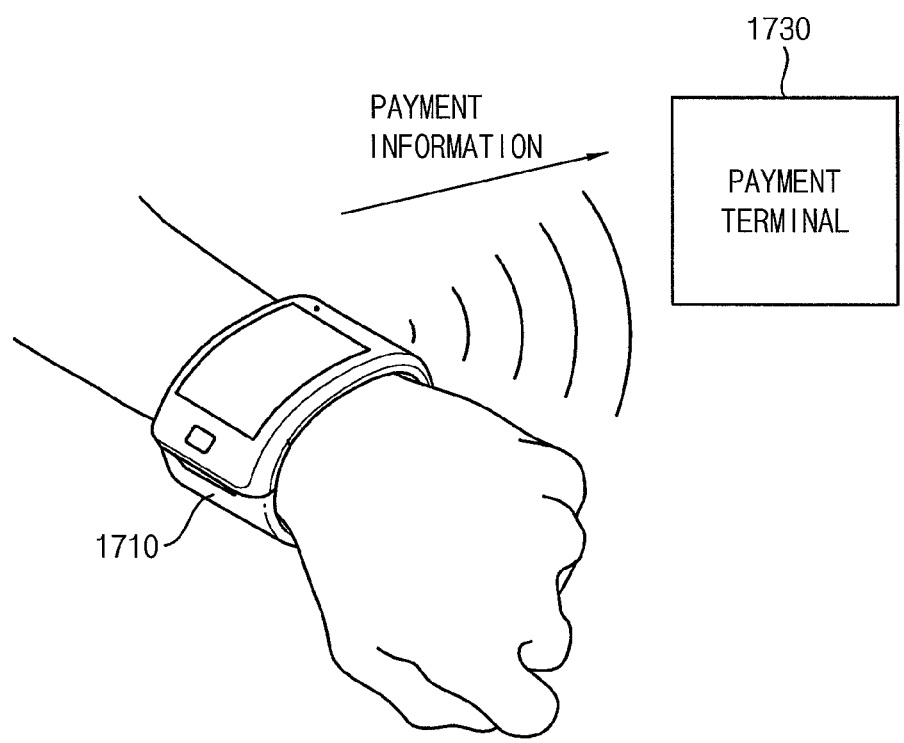
FIG. 18 is a diagram for describing another example of a wearable electronic device performing a near field communication according to example embodiments.

FIG. 17 is a diagram for describing an example of a wearable electronic device performing a near field communication according to example embodiments, and FIG. 18 is a diagram for describing another example of a wearable electronic device performing a near field communication according to example embodiments.

Referring to FIG. 17, the wearable electronic device 100 may be embodied as a wearable electronic device 1610. The wearable electronic device 1610 according to example embodiments may perform pairing or a data transfer with another wireless communication device 1630 through a near field communication while the wearable electronic device 1610 is being worn. For example, the wearable electronic device 1610 may perform the pairing with the wireless communication device 1630 to perform another desired (or, alternatively, predetermined) wireless communication (e.g., a Bluetooth or a Wi-Fi). By the pairing, the wearable electronic device 1610 and the wireless communication device 1630 may be paired or bonded by sharing a shared key (or a link key). According to example embodiments, the wearable electronic device 1610 may perform the data transfer with the wireless communication device 1630 through the near field communication, or may perform the data transfer with the wireless communication device 1630 through the predetermined wireless communication (e.g., the Bluetooth or the Wi-Fi) paired through the near field communication.

Referring to FIG. 18, the wearable electronic device 100 may be embodied as a wearable electronic device 1710. The wearable electronic device 1710 according to example embodiments may perform an electronic payment by transferring payment information (e.g., credit card information) to a payment terminal 1730 through a near field communication while the wearable electronic device 1710 is being worn.

As described above, the wearable electronic device 1610 and 1710 according to example embodiments may perform the pairing, the data transfer, the electronic payment, etc. through the near field communication while the wearable electronic device 1610 and/or 1710 is being worn.

Figure 19:
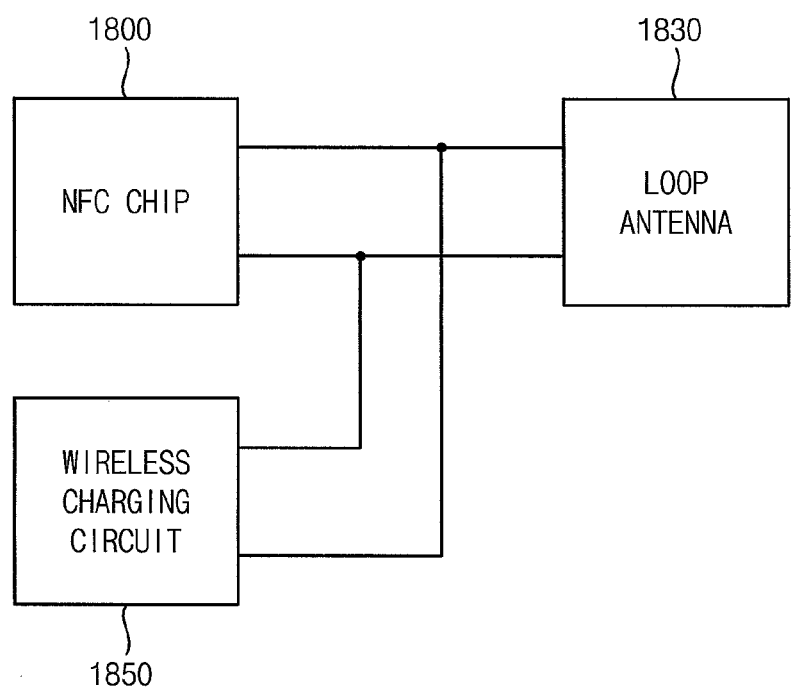
FIG. 19 is a diagram for describing an example of a wearable electronic device performing a near field communication and/or wireless charging according to example embodiments.

FIG. 19 is a diagram for describing an example of a wearable electronic device performing a near field communication and/or wireless charging according to example embodiments.

Referring to FIG. 19, a wearable electronic device according to example embodiments may include a loop antenna 1830, an NFC chip 1800 and a wireless charging circuit 1850. The loop antenna 1830 may be connected not only to the NFC chip 1800, but also to the wireless charging circuit 1850 for wireless charging. The wireless charging circuit 1850 may be wirelessly supplied with power through the loop antenna 1830, and thus may charge the supplied power for the wearable electronic device. Thus, the loop antenna 1830 may be used not only as an NFC antenna for a near field communication, but also as a loop antenna for wireless charging.

The example embodiments of the inventive concepts may be applied to any wireless electronic device including a display panel. For example, the example embodiments of the inventive concepts may be applied to any wireless electronic device, such as a smart watch, a wrist band electronic device, a necklace type electronic device, a glasses type electronic device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the example embodiments of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A wearable electronic device, comprising:
a display panel configured to display an image;
a main board including a processor configured to control an operation of the wearable electronic device;
a metal frame defining a perimeter of the wearable electronic device, the metal frame including a metal material, the metal frame having first and second terminals, the first terminal being adjacent to the second terminal with a slit therebetween;
a loop antenna between the display panel and the main board, the loop antenna configured to connect to the first and second terminals of the metal frame; and
a near field communication (NFC) chip configured to connect to the metal frame and the loop antenna, the NFC chip configured to perform a near field communication by transmitting or receiving an NFC signal using the metal frame and the loop antenna.

2. The wearable electronic device of claim 1, wherein
the loop antenna has third and fourth terminals, the third terminal being adjacent to the fourth terminal with a cut portion therebetween, and
the NFC chip configured to connect to the metal frame and the loop antenna through the third and fourth terminals of the loop antenna.

3. The wearable electronic device of claim 1, wherein the metal frame further comprises:
a third terminal and a fourth terminal, the third terminal being adjacent to the fourth terminal with a second slit therebetween, and wherein
the NFC chip is configured to connect to the metal frame and the loop antenna through the third and fourth terminals of the metal frame.

4. The wearable electronic device of claim 1, wherein the loop antenna comprises:
a loop coil including a metal material, the loop coil having two or more turns.

5. The wearable electronic device of claim 4, wherein the loop coil has one of a circular shape, a rectangular shape, a polygonal shape and an elliptical shape.

6. The wearable electronic device of claim 4, wherein the loop coil has a multi-layer structure.

7. The wearable electronic device of claim 4, wherein the loop antenna further comprises:
a secondary loop coil spaced apart from the loop coil, the secondary loop coil configured to magnetically couple to the loop coil.

8. The wearable electronic device of claim 7, wherein the loop coil and the secondary loop coil are at a same layer, and the secondary loop coil is configured to surround the loop coil.

9. The wearable electronic device of claim 7, wherein the loop coil and the secondary loop coil are at a same layer, and the loop coil is configured to surround the secondary loop coil.

10. The wearable electronic device of claim 7, wherein the loop coil and the secondary loop coil are at different layers.

11. The wearable electronic device of claim 1, further comprising:
a magnetic sheet between the loop antenna and the main board.

12. The wearable electronic device of claim 1, further comprising:
a magnetic sheet on an inner surface of the metal frame.

13. The wearable electronic device of claim 1, further comprising:
a printed circuit board (PCB) configured to connect the display panel and the main board,
wherein the loop antenna is between the PCB and the main board.

14. The wearable electronic device of claim 1, further comprising:
a printed circuit board (PCB) configured to connect the display panel and the main board,
wherein the loop antenna is between the display panel and the PCB.

15. The wearable electronic device of claim 1, further comprising:
a printed circuit board (PCB) configured to connect the display panel and the main board,
wherein the PCB is on a first portion of a back surface of the display panel, and
wherein the loop antenna is on a second portion of the back surface of the display panel such that the loop antenna does not overlap the PCB.

16. The wearable electronic device of claim 1, further comprising:
a wireless charging circuit connected to the loop antenna, wherein
the loop antenna is configured to wirelessly supply the wireless charging circuit with power.

17. The wearable electronic device of claim 1, wherein the wearable electronic device is configured to pair with one or more of a wireless communication device, an electronic payment device and a data transfer device through the near field communication while the wearable electronic device is worn on a body of a user.

18. A near field communication (NFC) chip configured to connect to a metal frame and a loop antenna, the metal frame defining a perimeter of a wearable electronic device, the metal frame including a metal material, the metal frame having a first terminal and a second terminal, the first terminal being adjacent to the second terminal with a slit therebetween, the loop antenna being between a display panel and a main board of the wearable electronic device, the loop antenna configured to connect to the first terminal and the second terminal of the metal frame, and the NFC chip comprising:
an NFC controller configured to perform a near field communication by transmitting or receiving an NFC signal using the metal frame and the loop antenna.

19. The NFC chip of claim 18, further comprising:
a secure storage device connected to the NFC controller, the secure storage device configured to store information, wherein
the NFC controller is configured to transfer the information to an external device through the near field communication.

20. A near field communication (NFC) device comprising:
a metal frame defining a perimeter of the electronic device, the metal frame including a metal material, the metal frame having a first terminal a and second terminal, the first terminal being adjacent to the second terminal with a slit therebetween;
an antenna configured to transmit NFC signals in a direction perpendicular to a display panel of an electronic device associated therewith, and configured to connect to the first terminal and the second terminal of the metal frame of the electronic device; and
an NFC chip configured to transmit, via the antenna and the metal frame, the NFC signals to an external device.

* * * * *